United States Patent [19]

Häuser

[11] 4,279,360
[45] Jul. 21, 1981

[54] SYSTEM FOR FEEDING TWO SYNTHETIC-RESIN COMPONENTS TO A MOLD

[75] Inventor: Erhard Häuser, Schöffengrund, Fed. Rep. of Germany

[73] Assignee: Wilhelm Hedrich Vakuumanlagen GmbH & Co. K.G., Ehringshausen - Katzenfurt, Fed. Rep. of Germany

[21] Appl. No.: 13,075

[22] Filed: Feb. 21, 1979

[30] Foreign Application Priority Data

Feb. 25, 1978 [DE] Fed. Rep. of Germany ....... 2808183

[51] Int. Cl.$^3$ .............................................. B67D 5/52
[52] U.S. Cl. ........................................ 222/1; 222/63; 222/135; 222/250
[58] Field of Search ...................... 222/63, 71, 55, 135, 222/249, 250, 1, 52

[56] References Cited

U.S. PATENT DOCUMENTS

| | | | |
|---|---|---|---|
| 2,755,966 | 7/1956 | Lindars | 222/250 X |
| 3,370,759 | 2/1968 | Johansson | 222/249 |
| 3,390,433 | 7/1968 | Barnett et al. | 222/250 X |
| 3,653,545 | 4/1972 | Tanner | 222/250 X |
| 3,773,300 | 11/1973 | Hauser | 222/135 X |

FOREIGN PATENT DOCUMENTS 617684 10/1976 U.S.S.R. ................................. 222/249

Primary Examiner—David A. Scherbel
Attorney, Agent, or Firm—Karl F. Ross

[57] ABSTRACT

A two-component molding system according to this invention has a pair of supplies each containing a quantity of a respective fluid synthetic-resin component capable of reacting and hardening with the other component. Respective conduits having upstream ends connected via pumps to the respective supplies and downstream ends connected via metering devices to a mixing chamber extend from these supplies. Molds are connected to the mixing chamber. A controller connected to the pumps and to the metering devices determines the pumping volume/time rates and compares them with the respective downstream actual volume/time rate at the downstream ends of the conduits. In the event that the actual rates are not substantially identical to the pumping rates, the controller sounds an alarm and shuts down the system.

11 Claims, 1 Drawing Figure

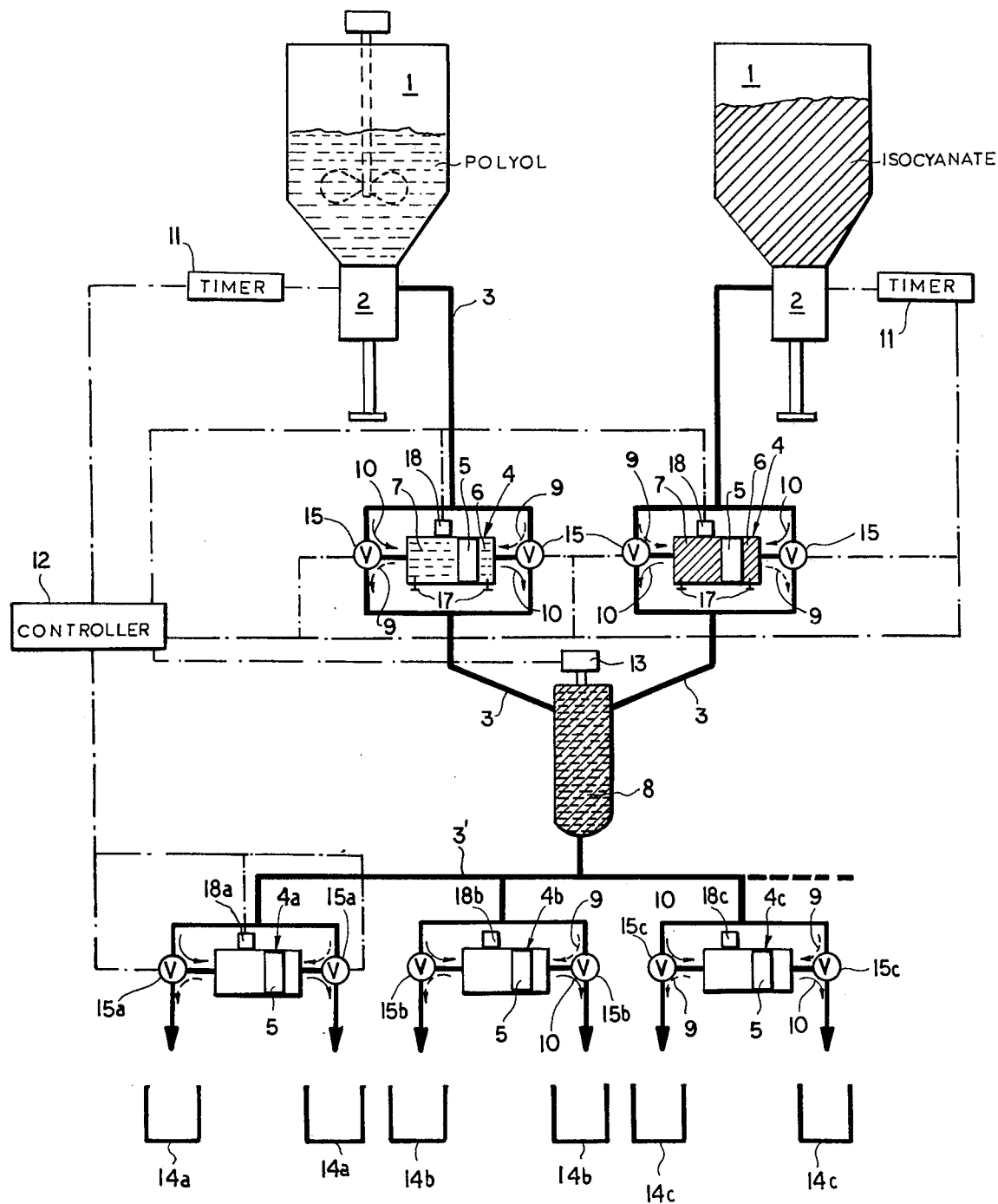

SYSTEM FOR FEEDING TWO SYNTHETIC-RESIN COMPONENTS TO A MOLD

FIELD OF THE INVENTION

The present invention relates to a system for molding a two-component synthetic resin, and a method of operating such a system. More particularly this invention concerns the production of molded articles of a thermosetting synthetic resin.

BACKGROUND OF THE INVENTION

A two-component synthetic-resin molding system normally has a pair of supplies each containing a respective synthetic-resin component capable of reacting and hardening with the other component, for example a polyol and an isocyanate for making polyurethane. Each of these supplies is provided with a respective pump such as described in my copending application Ser. No. 938,011 filed Aug. 30, 1978, whose entire disclosure is herewith expressly incorporated by reference. Each of these pumps delivers predetermined metered quantities or doses of the fluid from the respective supply to the upstream end of a conduit whose downstream end is normally connected to a mixing chamber where the two components are blended. From the mixing chamber the mixed components, which are reacting, are fed to respective molds. My copending application Ser. No. 946,602 filed Sept. 28, 1978, whose disclosure is also herewith incorporated by reference, describes further details of the mold-filling procedure.

It is essential that the proportions of the components be very exact in the mixture that is used to mold the objects, otherwise the physical properties of the molded object once cured will be altogether different from those desired. As the components are normally relatively viscous, and frequently either under high pressure or vacuum, pumping of them is an extremely difficult task, especially when compounded by the necessity of dosing them very exactly. To this end it is standard practice to provide the two supplies relatively close to each other, to mount the pumps directly on the supplies, and to drive the two pumps with the same motor. Thus assuming the strokes of the pumps, which are normally of the reciprocal type that deliver a predetermined volume with each stroke, are appropriately proportioned, one is normally ensured of obtaining the right proportions in the mixture at the downstream ends of the conduit.

It is only possible to ascertain that the mixture is, indeed, a correct one once the objects molded have cured. Thus if, for instance, the checkvalve of one of the pumps fails so that this pump delivers more or less fluid than it should with each stroke, this failure will only be noticed substantially later when a good deal of the resin has been wasted and quite a few objects have been molded. Similarly if there is some leakage of the system, only at a later time will this leakage become noticeable as a product failure.

Another disadvantage of this system is that it is necessary to mount the two supplies and their pumps very close to each other so that they can be jointly driven. Such mounting makes servicing of the equipment relatively difficult, and frequently complicates filling of the two supplies.

Another disadvantage of these systems is that the reciprocating pump normally used delivers the mixed components to the mold in pulses or spurts. During the return stroke of each of the pumps the mixture is not displaced, so that production speed is held down.

OBJECTS OF THE INVENTION

It is therefore an object of the present invention to provide an improved molding system for two-component synthetic resins.

Another object is to provide an improved method of operating such a molding system.

Yet another object of the invention is to provide a molding system wherein it is possible to monitor at all times whether the proportions of the various components are correct, and wherein the above-given disadvantages caused by jointly driving the two upstream feed pumps are avoided.

SUMMARY OF THE INVENTION

These objects are attained according to the instant invention in a system of the above-described general type wherein the actual volume/time rate of flow of each of the components is measured at a location at the downstream end of the conduit immediately upstream of the mixing chamber. This rate is then compared with the volume/time rate that the respective pump is delivering, and a signal is generated when the actual rate varies from the pumping rate. Thus, for instance, in a system using a reciprocal pump such as described in my first above-cited application a predetermined volume of the liquid should be delivered with each stroke of the pump. Should, however, the pump or conduit be leaking, one of the supplies be empty, or one of the checkvalves of the pump fail, the pump will continue to reciprocate or be stroked normally, but in reality will not be pumping the proper amount of liquid. The system according to this invention will readily ascertain this and generate a signal, which may itself be constituted by an automatic stopping of the system.

According to this invention the pumps of the supplies are each of the reciprocating type. The pumps can be operated by timers which stroke them periodically and the rate of the one pump should form with the rate of the other pump a proportion corresponding to that which the respective resins should bear to each other in the finished product. The control means counts the strokes of the pumps and compares them with the actual value derived at the downstream end of the conduit.

According to yet another feature of this invention the actual value is ascertained by dosing or metering devices each in a respective conduit. Such a device has a chamber subdivided by a movable piston or partition into a pair of compartments. A valve is provided at each of the compartments which can connect the respective compartments to the conduit either upstream or downstream from the chamber. The chambers are alternately connected to the upstream and downstream sides of the respective conduit, so that the fluid being pumped through the conduit will fill the one compartment, while pushing the partition and forcing the fluid from the other compartment, and once the one compartment is full the valves are reversed so that fluid fed into the other, now empty, compartment forces the previous charge of fluid out. The strokes of this movable partition, which can be limited by means of adjustable stops, are counted and compared with time to derive the actual volume/time rate. It is therefore possible in a very simple manner to compare the pumping and actual volume/time rates, in particular when the pump is set up to only pump a very small quantity with each stroke.

According to further features of this invention a further such metering device with valves can be provided between the mixing device and each of the molds to be filled. This allows control over the exact quantity of mixture being filled into each mold. Such a device can readily be programmed to fill various molds having cavities of different sizes.

BRIEF DESCRIPTION OF THE DRAWING

The sole FIGURE of the drawing is a schematic and a diagrammatic view of the system according to this invention.

SPECIFIC DESCRIPTION

As shown in the drawing the apparatus according to this invention has a pair of two identical supplies 1, one of which contains one compartment of a synthetic-resin mixture and the other of which contains another component, here a polyol being held in the one supply 1 and an isocyanate being held in the other. Directly mounted on each of these supplies 1, which may be under super or subatmospheric pressure, is a dosing pump 2 of the type described in detail in my above-cited patent application Ser. No. 938,011. Such a dosing pump has a piston displaceable along an axis and having an axially directed frustoconical end face surrounding an axially extending cylindrical projection. A housing surrounds this piston and forms with the end face a compartment. This housing is formed with an axially extending cylindrical inlet port aligned with and fittable over the projection of the piston and is also formed with a radially opening outlet port. As the piston moves toward the inlet port its projection will fit into it, blocking it and allowing liquid trapped betwen the piston and the housing to be forced out of the outlet port. A checkvalve is normally provided at this outlet port.

A conduit 3 leads from the outlet port of each of the pumps 2 to a mixing chamber 8 provided with an agitator 13 like the supplies 1. The mixing chamber is connected via a further conduit 3' to a plurality of molds 14a', 14a'', 14b', 14b'', 14c' and 14c''.

According to the invention the conduits 3 are each interrupted so that the fluid forced into these conduits 3 by the pumps 2 can pass through respective metering devices 4. To this end each metering device 4 has a piston 5 which acts as a partition and subdivides its interior into a pair of compartments 6 and 7. These compartments 6 and 7 are connectable via the valves 15 to the respective conduits 3 upstream and downstream.

More particularly the valves 15 can be operated jointly so that in one position they permit fluid flow into and out of respective metering device 4 as shown by the dashed-line arrows 9 and in their other alternate positions they allow flow into and out of the respective metering device 4 as shown by the solid-line arrows 10.

More particularly timers 11 operated by a controller 12 periodically reciprocate the pistons of the pumps 2 so as to dose the upstream ends of the conduits 3 with metered quantities of the respective fluids. Assuming the valves 15 to be in the position allowing flow in the direction of arrows 9, the liquid in the conduits will flow into the compartment 6 of the left-hand metering device 4 and into the compartment 7 of the right-hand metering device 4. The respective pistons 5 will be moved toward the other compartments until they abut the end walls or movable stops 17 of these metering devices 4. Then the controller 12 will automatically reverse the positions of the valves 15 so that flow will continue in the directions indicated by a solid arrow 10. Naturally the filled compartment 6 of the left-hand device 4 and the filled compartment 7 of the right-hand device 4 will be emptied into the downstream portions of conduits 3 to flow into the mixing chamber 8 where the ingredients are united. Sensors 18 of the metering devices 4 detect the stroking of the respective pistons 5 and feed this information to the controller 12.

Naturally each stroke of a piston 5 represents a displacement of a predetermined quantity of the respective fluid through the metering device 4. Thus the controller 12 can compare the actual volume/time rate of flow at the metering devices 4 with the volume/time rate of flow as determined by the timers 11 for the pumps 2. So long as the two rates for each ingredient are approximately the same the controller 12 will continue to operate the device. Once, however, the one rate varies from the other, as would for instance be the case in the event of failure of the check valve of one of the pumps 2, the controller will shut down the device and sound an alarm.

Also in accordance with this invention further metering devices 4a-c are associated with the molds 14a'-14c'' and have respective valves 15a-15c which function substantially identically to the valves 15 of the metering devices 4. The controller 12 may also be connected to these valves 15a-c as well as to sensors 18a-c which therefore ensure the proper metering of the liquid at a location immediately upstream of the molds 14a'-14c''. Thus leakage along the flow path at any location in the system can be detected, as can a blockage of any of the lines.

The device according to this invention therefore ensures that the ingredients will be exactly perfectly proportioned, and that the proper mixture will be fed to all of the molds. A leak anywhere in the system will be instantly detected, as will a malfunction of either of the pumps 2.

We claim:

1. A system for molding a two-component synthetic resin, said system comprising:
   a pair of supplies each containing a respective quantity of a respective fluid synthetic-resin component capable of reacting and hardening with the other component;
   respective conduits each having an upstream end and a downstream end;
   respective pumps between said upstream ends and the respective supplies for feeding said fluid components from said supplies to said upstream ends of the respective conduits at respective pumping volume/time rates;
   respective measuring means in said conduits immediately upstream of said downstream ends for measuring the downstream actual volume/time rate of flow of said fluids in the respective conduits; and
   control means connected to said pumps and to said measuring means for comparing each of said pumping rates with the respective downstream actual rate and for generating an output when each pumping rate is not generally the same as the respective downstream actual rate.

2. The system defined in claim 1, further comprising a mixing chamber into which both of said downstream ends empty.

3. The system defined in claim 1 wherein each of said pumps is of the reciprocating type normally delivering a predetermined volume of the respective fluid with each stroke, said control means counting said strokes.

4. The system defined in claim 1 wherein each of said measuring means includes:
- a chamber;
- a movable partition subdividing said chamber into a pair of compartments, whereby displacement of said partition in one direction increases the size of one compartment and decreases the size of the other and vice versa;
- valve means for alternately connecting the respective conduit to said compartments, whereby said partition is displaced with each alternation in a stroke in said chamber; and
- means for generating a signal at each stroke of said partition, whereby each such signal indicates that a predetermined volume of the respective fluid has traversed said chamber.

5. The system defined in claim 4 further comprising adjustable stops for limiting the strokes of said partitions.

6. The system defined in claim 4 wherein each of said valve means including two valves respectively connected to the respective compartments, said valve means being displaceable between a pair of positions in one of which one of said valves connects the respective compartment to the respective conduit upstream of said chamber and the other of said valves connects the respective compartment to the respective conduit downstream of said chamber and in the other of which said one valve connects the respective compartment to the respective conduit downstream of said chamber and said other valve connects the respective compartment to the respective conduit upstream of said chamber.

7. A method of operating a molding system having:
- a pair of supplies each containing a respective quantity of a respective fluid synthetic-resin component capable of reacting and hardening with the other component;
- respective conduits each having an upstream and a downstream and; and
- respective pumps for feeding said fluid component from said supplies to said upstream ends of the respective conduits at respective pumping volume/time rates;

said method comprising the steps of:
- measuring at the downstream end of each of said conduits the actual volume/time rates of passage of said fluids through the respective conduits;
- comparing each of said actual rates with the respective pumping rate; and
- generating a signal when either of said actual rates varies substantially from the respective pumping rate.

8. A method defined in claim 7 wherein said pumps are each reciprocal and each pump a respective predetermined quantity of the respective fluid with each stroke, said method comprising the step of reciprocating each of said pumps.

9. The method defined in claim 8 wherein said actual rates are measured by metering devices each having a chamber subdivided by a movable partition into a pair of compartments, one compartment of each of said chambers being connected to the respective conduit to receive fluid therefrom and the other compartment being connected thereto to deliver fluid thereto, and then the connections being reversed so that said partitions are reciprocated in said chambers as the pressure to one side of each partition moves same and forces fluid on the other side thereof from the respective chamber, the strokes of said partitions being counted to ascertain the respective actual rates.

10. The method defined in claim 7, further comprising the step of mixing said fluid together in a mixing chamber connected to both of said downstream ends.

11. A synthetic-resin molding system comprising:
- a supply containing a quantity of a fluid synthetic resin;
- a conduit having an upstream end and a downstream end;
- conveying means between said upstream end and said supply for feeding said resin from said supply to said upstream end at a predetermined and generally constant pumping volume/time rate;
- measuring means in said conduit immediately upstream of said downstream end for measuring the downstream actual volume/time rate of flow of fluid in said conduit; and
- control means connected to said conveying and measuring means for comparing said pumping rate with said actual rate and for generating an output when each pumping rate is not generally the same as said actual rate.

* * * * *